United States Patent [19]
Lahijani

[11] Patent Number: 6,013,719
[45] Date of Patent: Jan. 11, 2000

[54] APPLICATIONS OF LOW MELT VISCOSITY POLYTETRAFLUORETHYLENE

[75] Inventor: Jacob Lahijani, Wilmington, Del.

[73] Assignee: E. I. du Pont de Nemours and Company, Wilmington, Del.

[21] Appl. No.: 09/094,943

[22] Filed: Jun. 15, 1998

[51] Int. Cl.⁷ .............................. C08L 27/12; C08L 77/00
[52] U.S. Cl. ........................ 524/508; 524/502; 524/514; 525/151; 525/153; 525/180; 525/185; 525/189
[58] Field of Search ...................................... 525/185, 153, 525/151, 189, 180; 524/508, 514, 502

[56] References Cited

U.S. PATENT DOCUMENTS

| | | | |
|---|---|---|---|
| 4,332,714 | 6/1982 | Haaf et al. | 524/141 |
| 4,816,556 | 3/1989 | Gay et al. | 528/176 |
| 4,952,630 | 8/1990 | Morgan et al. | 525/72 |
| 5,204,400 | 4/1993 | Kelly et al. | 524/405 |
| 5,223,343 | 6/1993 | Tannenbaum | 428/422 |
| 5,708,122 | 1/1998 | Luise | 528/170 |

OTHER PUBLICATIONS

H.–J Hendriock, "PTFE Micropowders", Kunstoffe German Plastics, 76, pp. 920–926 (1986) and translation of pp. 63–66.

Kirk–Othmer, The Encyclopedia of Chemical Technology, 4$^{th}$ Ed., published by John Wiley & Sons (1994), pp. 637–639, vol. 11.

*Primary Examiner*—Ana Woodward
*Attorney, Agent, or Firm*—Thomas W Steinberg

[57] ABSTRACT

Low melt viscosity polytetrafluorethylene (PTFE), i.e. having a melt viscosity of 50 to $1\times10^5$ Pa·s at 372° C., is combined with non-fluorinated thermally stable polymer such as polyarleneetherketone to provide melt-fabricability application for the low MV PTFE and provide improved properties for the thermally stable polymer.

13 Claims, No Drawings

APPLICATIONS OF LOW MELT VISCOSITY POLYTETRAFLUORETHYLENE

FIELD OF THE INVENTION

This invention relates to uses of low melt viscosity polytetrafluoroethylene.

BACKGROUND OF THE INVENTION

Polytetrafluoroethylene (PTFE), commonly available as TEFLON® TFE fluoropolymer resin (DuPont), while known for its thermal stability, high melting temperature, chemical inertness and lubricity (low coefficient of friction and non-stick character) is also known for its non-melt-fabricability, i.e. it cannot be fabricated by such usual melt-fabrication technique as melt extrusion, including injection molding. Instead, this resin is fabricated by such non-melt flow techniques as paste extrusion (fine powder type of PTFE) and compression molding (granular type of PTFE) into strong articles, the strength of which can be augmented by sintering. The non-melt fabricability of the PTFE resin arises from the fact that it does not flow in the molten state, whereby it has a melt viscosity of at least $1 \times 10^8$ Pa·s at 380° C. The terms "polytetrafluoroethylenel" and "PTFE" used in the literature refers to this non-melt flowable, non-melt-fabricable PTFE. For clarity in the discussion to follow, however, this PTFE will be referred to as high MV (melt viscosity) PTFE.

Low MV PTFE is also commercially available and used in small amounts, relative to the consumption of high MV PTFE, the low MV PTFE having an MV of 50 to $1 \times 10^5$ Pa·s at 372° C. and available for example as ZONYL® fluoroadditive (DuPont). The low MV PTFE can be obtained by irradiation degradation of the high MV PTFE to reduce the molecular weight or directly by polymerization technique such as disclosed in U.S. Pat. No. 5,223,343 (Example 1). In either case, the number average molecular weight (Mn) of the low MV PTFE is from 50,000 to 700,000, as compared to the molecular weight (Mn) of high MV PTFE which is at least 2,000,000. The low MV PTFE has the thermal stability, chemical inertness, lubricity, and high melting temperature similar the high melt viscosity PTFE. The much lower MV of this PTFE makes the PTFE melt flowable, as indicated by its melt viscosity mentioned above, but the much lower molecular weight of this PTFE deprives it of strength, whereby articles molded from this low MV PTFE by melt extrusion break upon handling. For example, the beading extruded in the MV determination breaks upon the slightest flexing, and tensile testing samples formed by injection molding break upon mere clamping in the tensile testing machine, whereby the resin has no measureable tensile strength. Thus, although melt flowable, the low MV PTFE is not melt fabricable. This has relegated the utility of the low MV PTFE to such uses as additives in liquid lubricants and in supported coatings. This low MV PTFE is often distinguished from the PTFE described above as the high MV PTFE by being called PTFE micropowder.

There is a need to find greater utility of the low MV PTFE.

SUMMARY OF THE INVENTION

The present invention satisfies this need by combining the low MV PTFE with non-fluorinated polymer which is thermally stable at a temperature of at least 140° C. in amounts of 5 to 95 wt % of each resin, to total 100 wt % based on the combined weight of the low MV PTFE and non-fluorinated polymer.

The resultant compositions comprising the low MV PTFE and non-fluorinated polymer are melt-fabricable to product articles exhibiting improved properties. For example, such compositions in which the low MV PTFE predominates exhibit surprisingly high strength and greater dimensional stability under load. Compositions in which the non-fluorinated polymer predominates also exhibit surprisingly high strength.

In one embodiment of the present invention, fibrous filler is present in the composition, in an amount of 10 to 35 wt % based on the combined weight of the low MV PTFE, non-fluorinated polymer, and fibrous filler. The presence of a small proportion of the low MV PTFE in the three component composition surprisingly improves the toughness of the composition. This three component composition also exhibits surprisingly high tensile strength at high loadings of low MV PTFE in the composition.

DETAILED DESCRIPTION

The low MV PTFE used in the present invention, whether obtained by irradiation degradation of high MV PTFE or by direct polymerization, preferably has a melt viscosity of 100 to $1 \times 10^4$ Pa·s. Melt viscosities disclosed herein, unless otherwise indicated, are measured at 372° C. in accordance with the procedure of ASTM D1239-52T, modified as disclosed in U.S. Pat. No. 4,380,618. These resins are also known as PTFE micropowder to distinguish from PTFE in general which is the high MV PTFE. The PTFE micropowder (low MV PTFE) is a tetrafluoroethylene homopolymer or modified homopolymer (contains a small amount, e.g. less than 0.5 mol %, of comonomer to improve film forming capability) which has a molecular weight (Mn) of 50,000 to 700,000. PTFE micropowder is described further in Kirk-Othmer, The Encyclopedia of Chemical Technology, $4^{th}$ Ed., pub. by John Wiley & Sons (1994) on pp 637–639 of Vol. 11, and in the article H.-J Hendriock, "PTFE Micropowders", Kunstoffe German Plastics, 76, pp. 920–926 (1986). Although the PTFE micropowder is melt flowable, it is not melt fabricable by itself as described above.

Examples of the non-fluorinated thermally stable polymers include polyarylene-etherketone, poly(1,4(2,6-dimethylphenyl)oxide) commonly known as polyphenylene oxide, polyphenylene sulfide, polyamideimide, and polyether sulfone. These polymers are also fluorine-free and are thermoplastic. All of these resins are thermally stable at a temperature of at least 140° C. By thermally stable is meant that the resin can be continuously used or exposed free standing to such high temperature for a lengthy period of time, such as 10 days, without the resin degrading as indicated by lack of any noticeable change in chemistry or physical properties. The present invention is applicable to all such thermally stable polymers. Preferably, the non-fluorinated polymer is thermally stable at a temperature of at least 170° C. and more preferably, of at least 200° C. Preferably the polymer has a melting temperature of at least 220° C. and more preferably, at least 275° C. In the case of amorphous polymer, the glass transition temperature should preferably be at least 220° C. Polyerthersulfone is an amorphous polymer having a sustained use temperature (thermal stability) of up to 190° C. and glass transition temperature of 220° C. Polyamideimide is thermally stable at temperatures of at least 250° C. and melts at temperatures of at least 290° C. Polyphenylene sulfide melts at 285° C. Aromatic non-fluorinated thermally stable polymers are preferred, as providing the highest thermal stability. For example, polyaryleneetherketones are thermally stable at least 250° C. and melt at temperatures of at least 300° C. Polyaryleneetherketone is especially preferred.

The polyaryleneetherketone is a well known family of resins which includes polyetherketone having the repeat unit

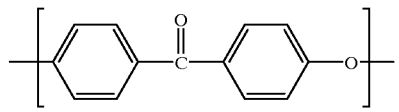

polyetheretherketone having the repeat unit

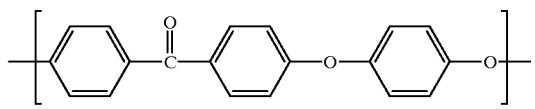

and polyetherketoneketone having the repeat unit

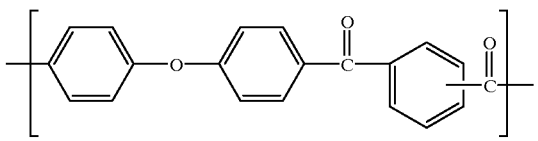

wherein the arylene group between the ketone groups of the polyetherketoneketone is typically a mixture of para- and meta-arylene groups, derived for example from isophthalyl and terephthalyl halides, present in the repeat units making up the resin. These resins are commonly known as PEK, PEEK, and PEKK, respectively, and are disclosed in one or more of the following U.S. Pat. Nos. 3,065,205, 3,441,538, 3,442,857, 5,357,040, 5,131,827, 4,578,427, 3,516,966, 4,704,448, and 4,816,556. The polyaryletherketones typically, in addition to high melting temperature, have high molecular weight, high strength and high modulus characteristic of engineering plastics. The inherent viscosity of the resin can for example be at least 0.4 measured on a 0.5 wt % solution in concentrated sulfuric acid at 30° C. Polyetheretherketone (PEEK) is desirable because of its high melting temperature of 334° C. Polyetherketoneketone (PEKK), melting temperature of at least 340° C., is preferred because it can have low melt viscosity and slow crystallization, which facilitates mixing of the resin with the low MV PTFE and providing melt flowability to the resultant composition. PEKK typically contains units derived from both terephthalyl (T) and isophthphalyl (I) halide in a ratio of 90:10 to 30:70, and more typically 80:20 to 60:40. As the proportion of T units decrease and I units increase, the crystallinity of the PEKK diminishes, until at 60:40, the PEKK crystallizes so slowly that it resembles an amorphous polymer except that it will exhibit a melting point. The present invention is applicable to all of the polyaryleneetherketone resins, i.e. they can all be advantageously combined with the low MV PTFE and to all of the family of non-fluorinated thermally stable polymers.

The proportions of the low MV PTFE and non-fluorinated thermally stable polymer can be varied widely, depending on the particular MV of the PTFE, the particular thermally stable polymer being used and the result desired. A preferred composition comprises 15 to 85 wt % of each of these components to total 100 wt % of the combination thereof. Additional preferred compositions comprise 15 to 30 wt % of the low MV PTFE, or 50 to 85 wt % of the low MV PTFE, the remainder in each composition to total 100 wt % of the two components being the non-fluorinated polymer.

While the low MV PTFE and non-fluorinated polymer are the essential components of compositions of the present invention, the compositions can also contain other ingredients. In a preferred embodiment of the present invention, fibrous filler is also present in the composition, which fibrous filler is thermally and dimensionally stable at temperatures at which the thermally stable polymer is stable, and more preferably, stable at the temperature at which the composition is melt fabricated, e.g. at a temperature of at least 330° C. and more preferably, at least 350° C. Examples of fibrous fillers include, glass fiber, graphite fiber, and titanate fiber. The combination of fibrous filler with the non-fluorinated polymer increases tensile strength over that of the non-fluorinated polymer by itself. The low MV PTFE provides a number of improvements to this combination, such as improved toughness and even further improvement in tensile strength, which is unexpected in view of the low MV PTFE by itself having no practical strength as a molded article.

When fibrous filler is present, the preferred proportion is 10 to 30 wt %, along with 30 to 80 wt % of the thermally stable polymer and 10 to 50 wt % of the low MV PTFE, to total 100 wt % of the combination of these three ingredients. An even more preferred composition is 20 to 30 wt % of the fibrous filler, 30 to 60 wt % of the thermally stable polymer, and 15 to 40 wt % of the low MV PTFE, to total 100 wt % as above.

The components of the compositions of the present invention can be melt blended as part of the extrusion process or can be premixed, followed by melt blending at temperature at which both resins are molten. Generally, the melt blending temperature will be at least 330° C. so as to be above the melting temperature of the low MV PTFE, which will usually melt at a temperature of 320° to 327° C. and preferably at 324° C. to 327° C. Under this condition, the low MV PTFE or the non-fluorinated polymer, as the case may be, becomes uniformly dispersed as fine particles (domains) in the major component which becomes the matrix. The resultant extrudate can be the final molded article, such as in the case of an injection molded article or an extruded tube, sheet or coating, or can be chopped into molding granules for subsequent melt processing into the article desired.

The compositions of the present invention have the utility of being melt fabricable into improved articles as compared to articles molded from the non-fluorinated polymer, with or without fibrous filler, by itself.

EXAMPLES

In the following Examples unless otherwise indicated, the blends of low MV PTFE and thermally stable polymer and fibrous filler, if present, were dry blended and then melt-fabricated by injection molding, the temperature profile in the screw/ram chamber being as follows: rear=370° C., center=380°, and front=380° C. The screw speed was 120 rpm and the back pressure was 50 psi (0.35 MPa). The mold temperature was about 100° C. and the mold cycle was 20 sec/20 sec. The tensile modulus test bars molded this way had a "dog bone" shape, 8/1/2 in (21.6 cm) long, 0.5 in (1.27 cm) wide in the test region, and 0.125 in (0.32 cm) thick. Tensile modulus was determined by carrying out the test procedure of ASTM D638. The PEKK resins used in the Examples was prepared in accordance with U.S. Pat. No. 4,816,556 (Gay et al.)

Example 1

In this experiment, the thermally stable polymer was PEKK having a ratio of T and I units of 60:40, the test bars of this polymer by itself having a tensile modulus of 495 ksi (1 ksi=1000 psi) (495 ksi=3416 MPa kg/cm$^2$) and the low MV PTFE was ZONYL® fluoroadditive grade MP 1600 having a (MFR 17/g/10 min at 372° C., from which the melt viscosity of 3×10$^3$ Pa·s is determined). The PEKK contained a small amount of TiO$_2$ pigment (10% by wt). The low MV PTFE had no tensile modulus in that test bars injection molded therefrom broke when clamped in the tensile testing machine.

Test bars of a blend of the MP1600 and PEKK in a 80:20 weight proportion exhibited a tensile modulus of 290 ksi (2001 MPa). Although the blend was composed mainly of "no strength" low MV PTFE, the blend exhibited considerable strength. In addition, the tensile strain to failure (elongation) of the PEKK by itself (5%) was reduced to 1.3% by the blend, i.e. the low MV PTFE increased the dimensional stability of the PEKK under load.

Example 2

The same low MV PTFE and PEKK were used in this experiment except that no TiO$_2$ was present in the PEKK. The tensile modulus of a 50:50 weight ratio blend (test bars) of these polymers was 360 ksi (2484 MPa) which was a surprisingly small reduction of the tensile modulus of the PEKK by itself, with no TiO$_2$ present (450 ksi (3105 MPa).

Example 3

In this experiment, the low MV PTFE used was the same as in Example 1, and the thermally stable polymer was PEKK in which the weight ratio of T to I units was 80:20. The tensile modulus of test bars of the blend containing 30 wt % of the MP1600 and 70 wt % of the PEKK was 463 ksi (3195 MPa) as compared to 531 ksi (3664 MPa) for the PEKK by itself. When the PEKK content of the blend was reduced to 50:50 weight ratio, the tensile modulus of test bars of the blend was still very high, namely 426 ksi (3188 MPa).

Example 4

In this experiment, the thermally stable polymer was polyphenylene sulfide (PPS). Blends of this resin with 20 wt % and with 40 wt % 6 of the low MV PTFE of Example 1 were extrudable into molding pellets with ease. The resulting molding pellets can be used to injection mold strong articles which exhibit fluoropolymer surface characteristics of low friction and high chemical inertness. Similar results are obtained when the PPS is replaced by other thermally stable polymers.

Example 5

This experiment shows the surprising effect of low MV PTFE on combinations of thermally stable polymer and fibrous filler. The polymer and low MV PTFE is the same as used in Example 1 and the fibrous filler is glass fiber (0.64 cm long chopped glass fiber, general purpose utility). As above, the PEKK/TiO$_2$ mixture exhibits a tensile modulus by itself of 495 ksi (3416 MPa). The presence of glass fiber in the composition in 80:20 and 70:30 weight ratios (PEKK composition:glass fiber) give tensile moduli of 910 ksi (6279 MPa) and 1140 ksi (7866 MPa), respectively.

Replacement of 20 wt % of the PEKK/TiO$_2$ composition by the corresponding amount of the low MV PTFE of Example 1 to give the composition 60:20:20 (weight ratio of the PEKK composition:MP1600:glass fiber) gives a tensile modulus of 1010 ksi (6969 MPa) which approaches that for the 80:20 blend above, which is surprising since the MP1600 has no tensile strength. Even more surprising is the increase in toughness which the MP1600 brings to the composition. The 80:20 composition exhibits a notched Izod impact strength (ASTM 256) of 1.24 ft-lb/in (4.27 joules/cm) as compared to 1.19 ft-lb/in (4.10 joules/cm) for the PEKK/TiO$_2$ composition by itself. The 60:20:20 composition exhibits an impact strength of 1.47 ft/lb/in (5.06 joules/cm), which is about 20% greater than for the 80:20 composition. When the MP1600 content is reduced to 15 wt % and the PEKK composition increased to 65 wt %, the remainder being glass fiber, the notched Izod is still greater (1.37 ft/lb/in, 4.72 joules/cm) than for the PEKK/TiO$_2$—glass fiber composition (80:20) by itself. Further decrease of the MP1600 content to 5 wt % to give the composition 75:5 (MP1600):20(glass fiber) still gives a higher impact strength of 1.39 ft-lb/in (4.79 joules/cm).

When the proportion of MP1600 is increased to form a 30:40(MP1600):20(glass fiber) composition, the tensile modulus increases to 1190 ksi (8211 MPa), and when the glass fiber content is increased to 30 wt % at the expense of the PEKK composition, the tensile modulus increases to 1590 ksi (10971 MPa), much greater than would be expected for this amount of increase in glass fiber content.

What is claimed is:

1. Composition comprising 15 to 85 wt % of non-fluorinated polymer selected from the group consisting of polyaryleneetherketone, polyphenylene oxide, polyamide-imide and polyethersulfone which is thermally stable at a temperature of at least 140° C. and 85 to 15 wt % of low melt viscosity polytetrafluoroethylene, to total 100 wt % based on the combined weight of said non-fluorinated polymer and said low melt viscosity polytetrafluoroethylene, the melt viscosity of said low melt viscosity polytetrafluoroethylene being 50 to 1×10$^5$ Pa·s.

2. The composition of claim 1 wherein said composition contains 10 to 35 wt % of fibrous filler, to total 100 wt % based on the weight of said non-fluorinated polymer, low melt viscosity polytetrafluorethylene, and fibrous filler.

3. The composition of claim 2 wherein the amount of said non-fluorinated polymer is 30 to 60 wt %, the amount of said low melt viscosity polytetrafluoroethylene is 15 to 40 wt %, and the amount of said fibrous filler is 20 to 30 wt %, to total said 100 wt %.

4. The composition of claim 3 comprising 60 wt % of polyaryleneetherketone, 20 wt % of said low melt viscosity polytetrafluoroethylene and 20 wt % of said fibrous filler.

5. The composition of claim 3 comprising 30 wt % of polyaryleneetherketone, 40% of said low melt viscosity polytetrafluoroethylene and 30 wt % of said fibrous filler.

6. Composition comprising 30 to 85 wt % of low melt viscosity polytetrafluoroethylene and a remainder of said composition comprising a non-fluorinated polymer which is thermally stable at a temperature of at least 140° C., to total 100 wt % based on the combined weight of said non-fluorinated polymer and said low melt viscosity polytetrafluoroethylene, the melt viscosity of said low melt viscosity polytetrafluoroethylene being 50 to 1×10$^5$ Pa·s.

7. The composition of claim 6 wherein said composition comprises 40 to 85 wt % of said low melt viscosity polytetrafluoroethylene.

8. The composition of claim 6 wherein said composition comprises 50 to 85 wt % of said low melt viscosity polytetrafluoroethylene.

9. The composition of claim 1 wherein said non-fluorinated polymer is a member selected from the group consisting of polyaryleneetherketone, polyphenylene oxide, polyphenylene sulfide, polyamideimide, and polyethersulfone.

10. The composition of claim 9, comprising 80 wt % of said low melt viscosity polytetrafluoroethylene and 20 wt % of polyaryleneetherketone.

11. The composition of claim 9, comprising 50 wt % of said low melt viscosity polytetrafluoroethylene and 50 wt % of polyaryleneetherketone.

12. The composition of claim 9, comprising 30 wt % of said low melt viscosity polytetrafluoroethylene and 70 wt % of polyaryleneetherketone.

13. The composition of claim 9, comprising 40 wt % of said low melt viscosity polytetrafluoroethylene and the remainder being polyphenylene sulfide.

* * * * *

UNITED STATES PATENT AND TRADEMARK OFFICE
CERTIFICATE OF CORRECTION

PATENT NO. : 6,013,719  
DATED : January 11, 2000  
INVENTOR(S) : Jacob Lahijani Page 1 of 1

It is certified that error appears in the above-identified patent and that said Letters Patent is hereby corrected as shown below:

Claim 9,
Line 1, change "1" to -- 5 --.

Signed and Sealed this

Twenty-sixth Day of February, 2002

Attest:

Attesting Officer

JAMES E. ROGAN
Director of the United States Patent and Trademark Office